United States Patent
Mederer

[11] 3,883,094
[45] May 13, 1975

[54] FOLDABLE CANARD ASSEMBLY

[75] Inventor: Andreas Mederer, Markt Schwaben, Germany

[73] Assignee: Messerschmitt-Bolkow-Blohm GmbH, Munich, Germany

[22] Filed: Nov. 1, 1973

[21] Appl. No.: 412,047

[30] Foreign Application Priority Data
Nov. 4, 1972 Germany.............................. 2254136

[52] U.S. Cl.................................. 244/45 A; 244/91
[51] Int. Cl.................................................. B64c 5/04
[58] Field of Search............ 244/45 R, 45 A, 46, 89, 244/91, 49; 114/137, 87

[56] References Cited
UNITED STATES PATENTS

| | | | |
|---|---|---|---|
| 2,601,962 | 7/1952 | Douglas | 244/89 |
| 2,747,816 | 5/1956 | Howard | 244/45 A |
| 2,960,286 | 11/1960 | Louthan | 244/91 |
| 3,680,816 | 8/1972 | Mello | 244/89 |

FOREIGN PATENTS OR APPLICATIONS

| | | | |
|---|---|---|---|
| 1,104,478 | 11/1955 | France | 244/49 |
| 349,779 | 3/1922 | Germany | 114/137 |

*Primary Examiner*—Trygve M. Blix
*Assistant Examiner*—Galen L. Barefoot
*Attorney, Agent, or Firm*—Woodhams, Blanchard and Flynn

[57] ABSTRACT

A foldable canard assembly for aircraft which have a device for effecting artificial stability and flight control apparatus. The canard assembly comprises a pair of wing units extendable laterally of the aircraft and adjustable about an axis longitudinally arranged of the aircraft to a position extending downwardly therefrom wherein said wing units cooperate together to form a single fin. The axis is preferably located at the bottom of a forward portion of the aircraft fuselage and the wing units are adjustable as desired between fully extended and fully folded positions. A control device is also provided for modifying the horizontal stabilizer surfaces of the tail unit to modify the lift generated thereby in order to compensate for the lift of the canards and thereby maintain longitudinal vertical stability of the aircraft.

6 Claims, 4 Drawing Figures

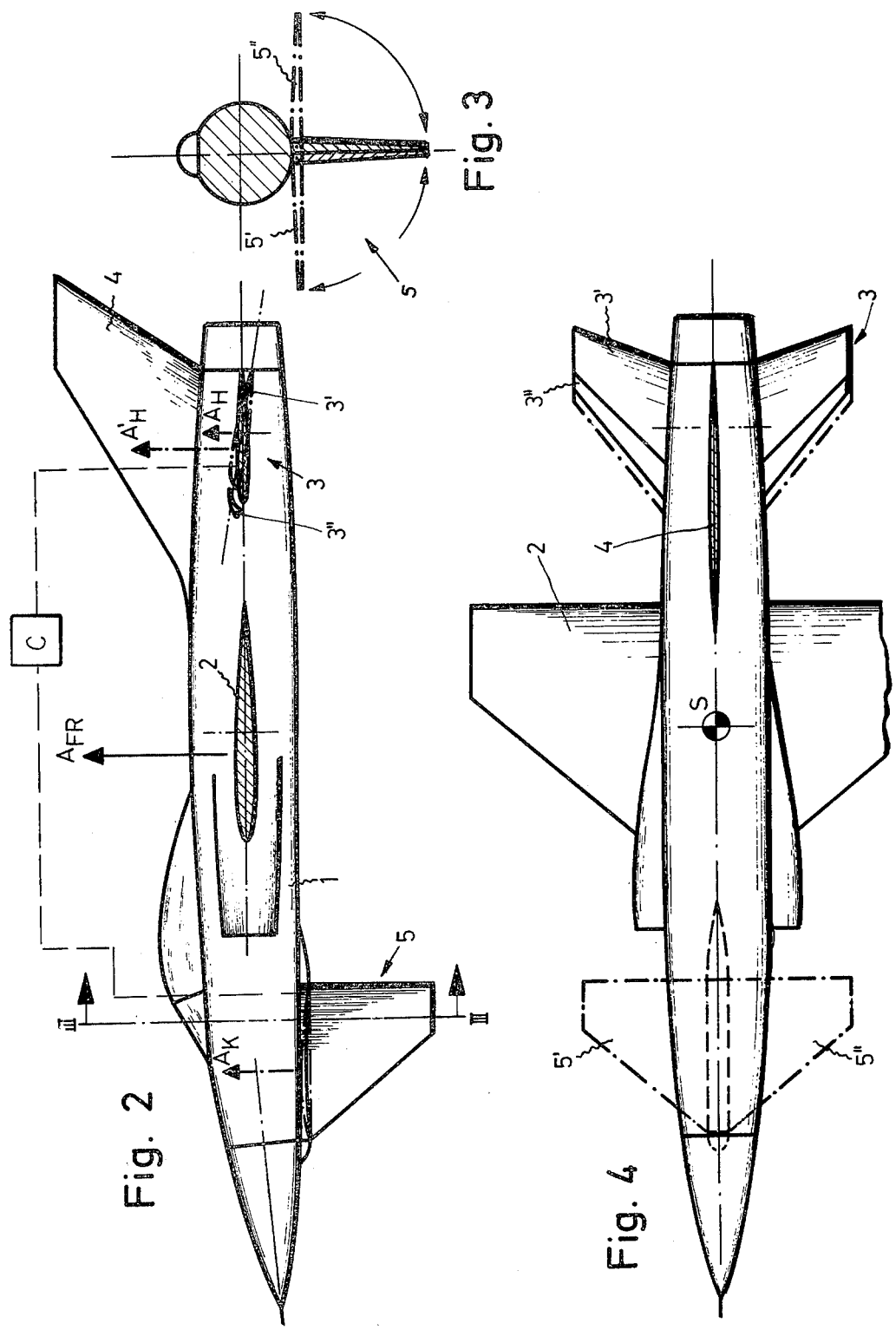

FOLDABLE CANARD ASSEMBLY

FIELD OF THE INVENTION

The invention relates to a foldable canard assembly, particularly for aircraft having means providing artificial stability and which are equipped with a flight controller.

BACKGROUND OF THE INVENTION

A canard assembly which can be folded about an axis positioned longitudinally of an aircraft is already known. Such a carnard assembly serves generally to improve the lateral stability and the lateral characteristics or the longitudinal stability and the longitudinal characteristics of an aircraft in relation to its flight mach number. Where the rudder unit is constructed as a foldable tail unit it is possible during high-speed flight to reduce excessive lateral stabilizing moments and corresponding rolling moments by moving the tail unit surfaces toward the sides. However, this has the disadvantageous result of impairing the longitudinal characteristics due to an increase of the static longitudinal stability, which impairing is created simultaneously with the improvement of the lateral characteristics. In the case of the arrangement of one single foldable rudder unit there is the further disadvantage that an asymmetric tail unit is created which generally pases additional aerodynamic and flight-mechanical problems.

It is further known (compare German Pat. No. 678,804) to arrange on an aerodynamic surface of an aircraft, for example on the wing, on the horizontal tail unit or on the rudder unit, pivotal flaps, which consist of two parts and which rest against one another in the null position or at most are spaced a small distance from one another and which when swung from their null position by means of a common operating member receive differing adjustment movements.

The basic purpose of the invention is to produce a foldable canard assembly for an aircraft of artificial stability whereby to improve both the flight performance and also the flight characteristics throughout the entire flying range. This is achieved according to the invention by arranging, in addition to the conventional horizontal tail unit, two canard assembly halves rotatable about an axis which extends in the direction of flight in such a manner along the aircraft fuselage, that by proper adjustment any desired V-form can be obtained or the canard assembly halves can also be folded together.

According to an advantageous development of the invention the surfaces of the rotatable canard assembly halves are arranged on the underside of the front portion of the aircraft fuselage. In order to assure that the canard assembly surfaces of the invention offer in folded-togther condition the least possible aerodynamic drag, the invention provides that they are profiled in such a manner that they create in folded condition a closed profile contour.

Through the lateral extension of larger canard assembly surfaces which are arranged on the front portion of the fuselage, an aircraft which up to now was statically stable becomes longitudinally in stable with a simultaneous increase of the lateral stability.

In conventional aircraft, longitudinal instability is characterized by the center of gravity position being located behind the entire aerodynamic center. In such positioning of the center of gravity, the flight performance improves due to favorable distribution of the individual lifts. To achieve optimum flight performance and for producing the required longitudinal stability with laterally extended canard assembly surfaces, the invention provides further that the rotatable canard assembly and a second conventional horizontal tail unit which is arranged on the aircraft tail are controllable through the flight control means, which adjusts the rotatable canard assembly at a flight performance optimum or flight characteristic optimum and produces through the conventional horizontal tail unit the required longitudinal stability.

Through the lateral extension of the canard assembly surfaces on the front portion of the aircraft fuselage, a positive angle of incidence produces a large tail-heavy moment which must be compensated through a suitable head-heavy moment. For this purpose the invention provides that the conventional, nonfoldable horizontal tail unit is equipped with high-lift means or is provided with a profile with a positive center-line curvature.

BRIEF DESCRIPTION OF THE DRAWINGS

The invention is illustrated in the drawings, in which:

FIG. 2 is the side view of an aircraft having a foldable canard assembly on the forward end of the aircraft fuselage;

FIG. 3 is a cross-sectional view of the forward end of the aircraft fuselage taken on the line III—III of FIG. 2;

FIG. 4 is the top view of the aircraft with the foldable canard assembly on the forward end of the fuselage as shown in FIG. 2.

DETAILED DESCRIPTION

Figure 1:
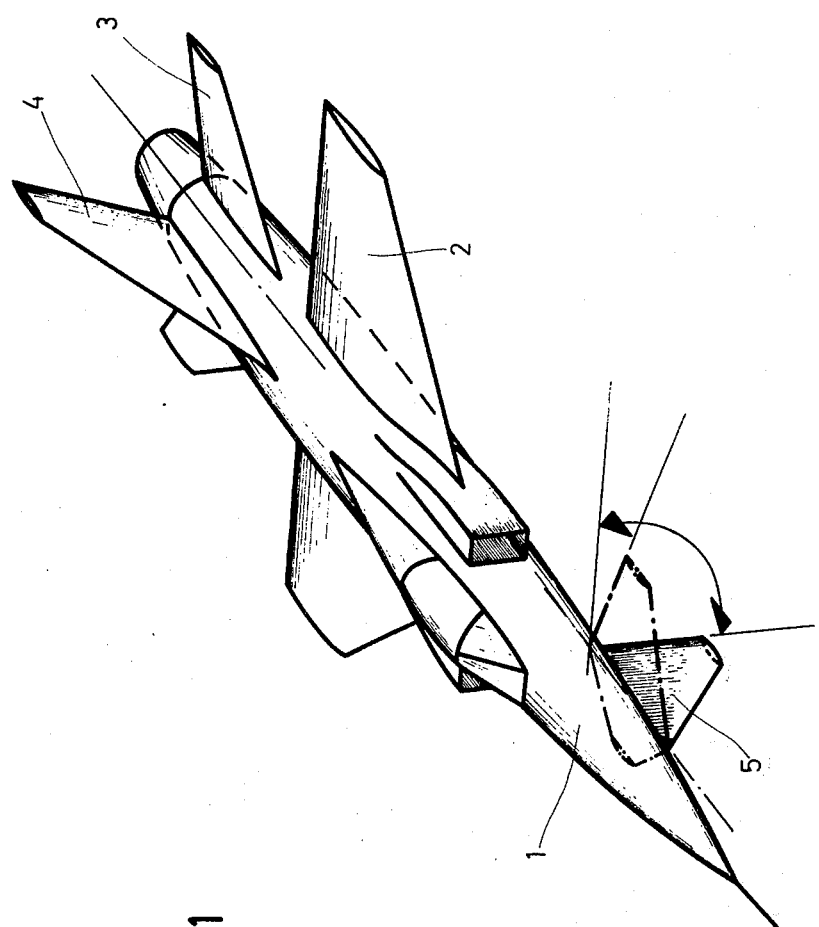
FIG. 1 is a perspective view of an aircraft with a foldable canard assembly on the forward end of the aircraft fuselage according to the invention.

In FIGS. 1 to 4, the numeral 1 identifies the fuselage, the numeral 2 the wing, the numeral 3 the horizontal tail unit, the numeral 4 the rudder unit and the numeral 5 the foldable canard assembly. The foldable canard assembly 5 consists of the two halves 5' and 5'' which are illustrated in folded condition by full lines and in extended condition by dash-dotted lines.

The horizontal tail unit 3 is composed of the fully movable horizontal tail unit halves 3' and the associated high-lift means 3''. The normal flight position of the horizontal tail unit is illustrated by full lines, the high-lift position by dash-dotted lines.

The flight-mechanical connections for the case of a foldable canard assembly on the front portion of the fuselage can be taken from FIG. 2. During normal flight the foldable canard assembly surfaces are folded. The wing-fuselage-lift force $A_{FR}$ and the horizontal tail unit lift force $A_H$ then act on the aircraft. The drag and thrust forces which also act on the aircraft are not indicated in FIG. 2. The moments which are caused by the lift forces around the aircraft center of gravity S are balanced out during properly trimmed flight. During the performance-optimum flight or slow flight or maneuvering flight there is applied to the aircraft, due to lateral extension of the front canard assembly surfaces 5' and 5'' and to a simultaneous higher incidence of the horizontal tail unit 3 or the extension of the horizontal tail unit slot forming means 3'', the foldable canard assembly lifting force $A_K$, the horizontal tail unit lifting force $A_H$, and the wing-fuselage-lifting force $A_{FR}$.

The horizontal tail unit lifting force $A_H$, must in trimmed flight by very must larger for balancing the moment caused by the foldable canard assembly lifting force $A_K$ around the center of gravity than the normal horizontal tail unit lifting force $A_H$. This is achieved by providing the horizontal tail unit with high-lift means 3'' and/or a profile with positive center-line curvature.

Lateral extension of the canard assembly surfaces 5' and 5'' arranged on the front part of the fuselage causes a shifting forwardly of the entire aerodynamic center of the aircraft. At a positive angle of incidence of the aircraft a positive lift $A_K$ is created simultaneously with the aerodynamic center shifting at a corresponding arrangement of the foldable canard assembly. The tail-heavy moment which is produced by this lift around the center of gravity must be compensated in trimmed flight by a corresponding positive incidence of the horizontal tail unit or by an additional lift on the horizontal tail unit.

The lifts $A_K$ and $A_H'$, so created considerably improves the trimmed polar curve of the aircraft, particularly a high-lift coefficients. The improvement is, however, obtained at the cost of lessening the natural aerodynamic longitudinal stability. The required longitudinal stability is here artificially created by an adjustment through the controller C of the conventional horizontal tail unit. The flight controller C thus takes over also the adjustment for optimum flight performance of the foldable canard assembly in relation to the flying speed and load multiple.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A foldable canard assembly for an aircraft having a fuselage, a main aerodynamic wing mounted on the mid section of said fuselage of said aircraft and a vertical tail assembly and a horizontal elevator assembly mounted on the aft section of said fuselage of said aircraft, comprising:
   a pair of equally sized and separate canards mounted on the forward section and each having means defining an airfoil thereon; and
   a pair of pivot means mounted on said aircraft fuselage forward of said main wing and defining a pair of pivot axes extending parallel to the longitudinal axis of said aircraft for pivotally securing said pair of separate canards to said aircraft, said pair of separate canards being pivotal between a first position wherein said canards both extend vertically downward from said aircraft fuselage and a second position wherein both of said canards extend horizontally and generally tangent to the lower surface of said forward section of said aircraft fuselage, said canards, when in said first position, extending in a parallel and contacting relation along their length so that said pair of vertically extending airfoils together define a single airfoil.

2. A foldable canard assembly according to claim 1, wherein said pair of pivot means are located on the underside of said forward section and said pivot axes are laterally offset from a vertical plane containing the central longitudinal axis for said aircraft a small distance sufficient to permit said pair of canards to pivot and contact each other when in said first position.

3. A foldable canard assembly according to claim 2, wherein said small distance is equal to the spacing between one of said pivot axes and one of the opposed airfoil surfaces on one of said canards when in said first position.

4. A foldable canard assembly according to claim 1, including control means for coordinating the movement of said canards with the control offered by said horizontal elevator assembly.

5. A foldable canard assembly according to claim 4, wherein said horizontal elevator assembly has high-lift means thereon.

6. A foldable canard assembly according to claim 5, wherein said high-lift means includes airfoil means having a profile with a positive center-line curvature.

* * * * *